(12) United States Patent
Hsu et al.

(10) Patent No.: US 11,341,342 B2
(45) Date of Patent: May 24, 2022

(54) OPTICAL ENCODER AND METHOD OF OPERATING THE SAME

(71) Applicant: AEOLUS ROBOTICS CORPORATION LIMITED, Hong Kong (HK)

(72) Inventors: Yueh Teng Hsu, Taipei (TW); Ching Te Lu, Taipei (TW)

(73) Assignee: Aeolus Robotics Corporation Limited, Wanchai (HK)

( * ) Notice: Subject to any disclaimer, the term of this patent is extended or adjusted under 35 U.S.C. 154(b) by 0 days.

(21) Appl. No.: 15/897,100

(22) Filed: Feb. 14, 2018

(65) Prior Publication Data

US 2019/0251301 A1 Aug. 15, 2019

(51) Int. Cl.
*G06K 1/12* (2006.01)
*G06K 7/14* (2006.01)
*G01D 5/347* (2006.01)

(52) U.S. Cl.
CPC ......... *G06K 1/121* (2013.01); *G01D 5/34792* (2013.01); *G06K 7/14* (2013.01)

(58) Field of Classification Search
CPC ...................................................... G06K 1/121
USPC ........................................................... 235/454
See application file for complete search history.

(56) References Cited

U.S. PATENT DOCUMENTS

| | | | | |
|---|---|---|---|---|
| 2004/0012794 | A1* | 1/2004 | Nahum | G01D 5/34776 356/620 |
| 2009/0194593 | A1* | 8/2009 | Kurihara | G07G 1/0054 235/462.41 |
| 2015/0323352 | A1* | 11/2015 | Nagura | G01D 5/24485 250/231.1 |
| 2017/0082463 | A1* | 3/2017 | Noguchi | G01D 5/26 |

* cited by examiner

*Primary Examiner* — Rafferty D Kelly
(74) *Attorney, Agent, or Firm* — Fenwick & West LLP

(57) ABSTRACT

An encoder connected to an object is provided. The encoder includes a plate, a sensor, a memory and a processor. The plate has a pattern thereon. The sensor is configured to obtain an image of a portion of the pattern. The memory is configured to store a first set of reference images corresponding to a portion of the pattern and angle and/or position information corresponding to the first set of images. The processor is configured to shift the first set of reference images to obtain a second set of reference images and to compare the obtained image with the first set of reference images and/or the second set of reference images.

17 Claims, 6 Drawing Sheets

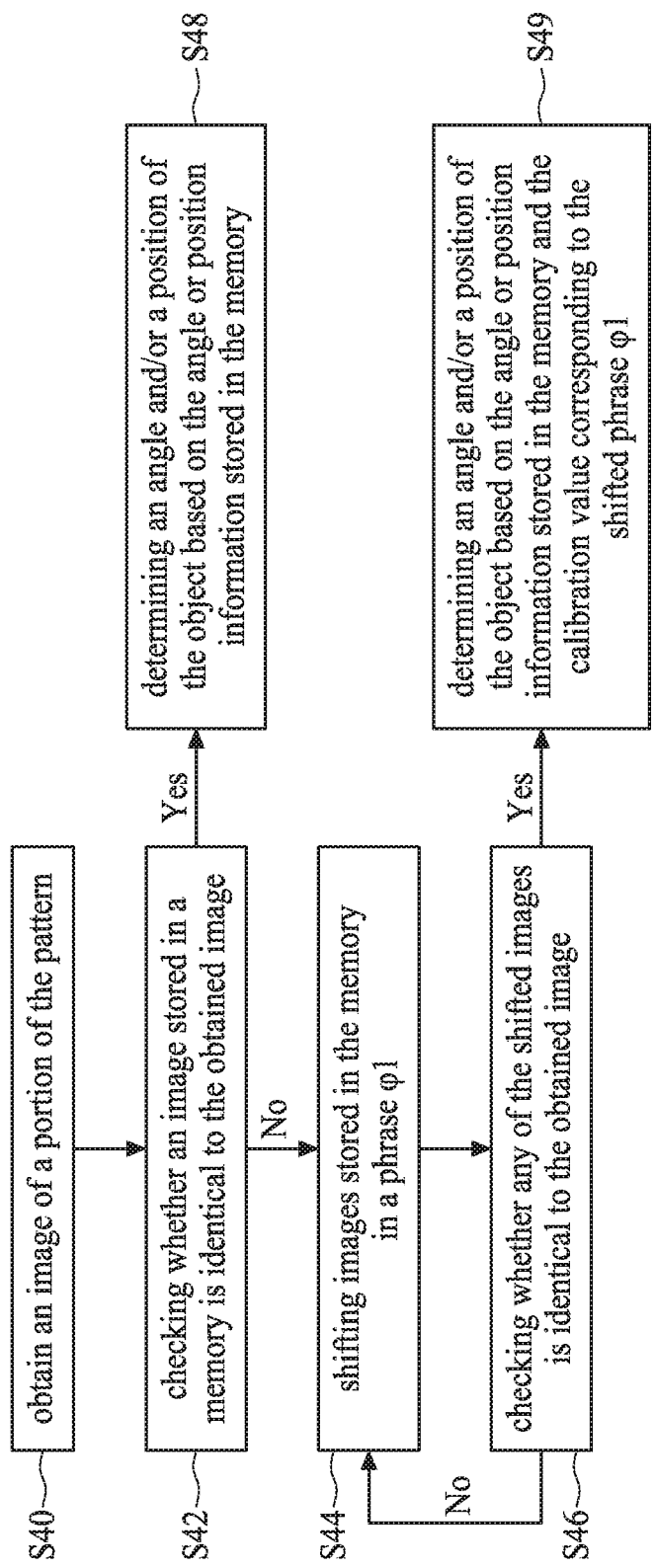

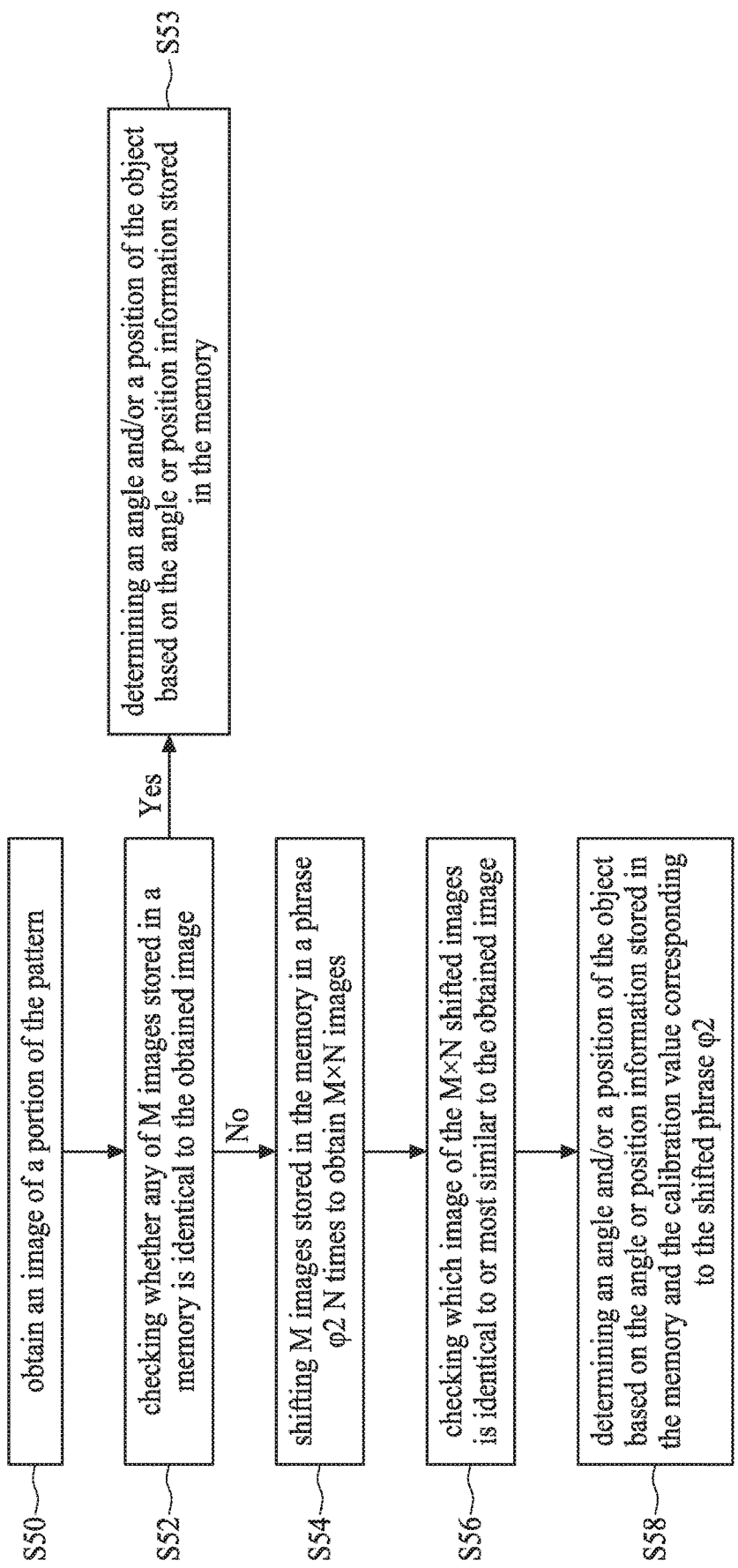

OPTICAL ENCODER AND METHOD OF OPERATING THE SAME

BACKGROUND

1. Technical Field

The present disclosure relates generally to an apparatus and a method for detecting a position and a motion thereof using sensor devices, and more specifically to an apparatus and a method for detecting a position and a motion thereof using optical encoder sensors.

2. Description of the Related Art

Optical encoders are useful in many applications. For example, an absolute encoder can be used to determine a position, a motion or an angle of an object by transforming a physical position into an electrical signal corresponding to such position. In a comparative rotation mechanism (e.g., robotic arm), an absolute encoder includes a sensor to read or detect predetermined patterns (e.g., a barcode) formed on a code plate and to generate a signal indicating an absolute position of the rotation mechanism. In general, to increase the accuracy of the detected portion of the rotation mechanism, it is required to increase the resolution of the patterns on the code plate and/or the size of the code plate. However, increasing the size of the disc would hinder the miniaturization of the encoder, and increasing the resolution of the patterns on the code plate would increase the cost, which would in turn reduce competitiveness in the market.

SUMMARY

In one or more embodiments, an encoder connected to an object is provided. The encoder includes a plate, a sensor, a memory and a processor. The plate has a pattern thereon. The sensor is configured to obtain an image of a portion of the pattern. The memory is configured to store a first set of reference images corresponding to a portion of the pattern and angle and/or position information corresponding to the first set of images. The processor is configured to shift the first set of reference images to obtain a second set of reference images and to compare the obtained image with the first set of reference images and/or the second set of reference images.

In one or more embodiments, a method for operating an encoder connected to an object is provided. The method includes (a) obtaining an image of a portion of a pattern; (b) shifting a first set of reference images in a phase to obtain a second set of reference images; and (c) comparing the obtained image with the first set of reference images and/or the second set of references images.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

FIG. 4 illustrates a method for operating an optical encoder in accordance with some embodiments of the present disclosure;

FIG. 5 illustrates a method for operating an optical encoder in accordance with some embodiments of the present disclosure.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
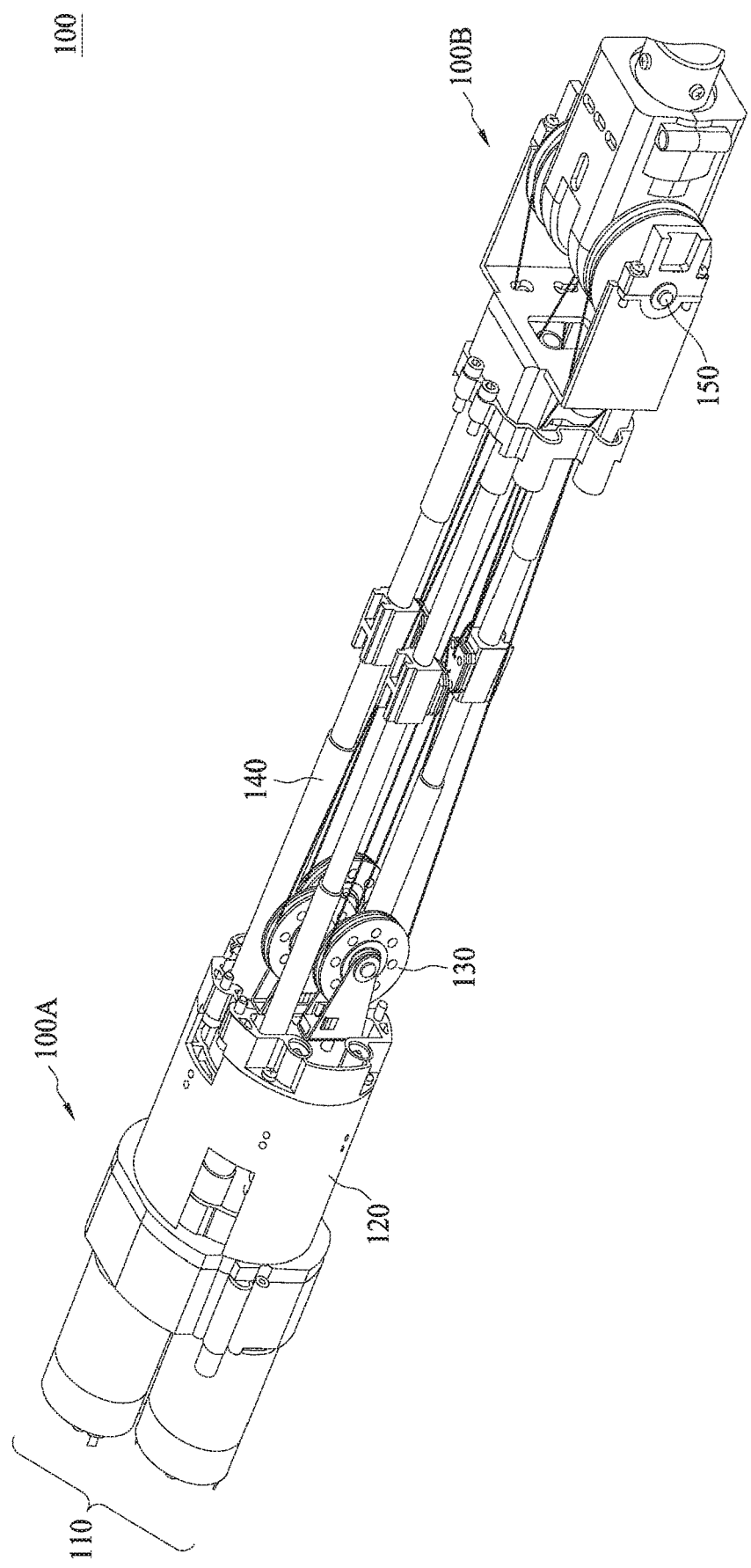
FIG. 1 illustrates a perspective view of a rotatable mechanism in accordance with some embodiments of the present disclosure.

Structures, manufacturing and use of the embodiments of the present disclosure are discussed in detail below. It should be appreciated, however, that the embodiments set forth many applicable concepts that can be embodied in a wide variety of specific contexts. It is to be understood that the following disclosure provides many different embodiments or examples of implementing different features of various embodiments. Specific examples of components and arrangements are described below for purposes of discussion. These are, of course, merely examples and are not intended to be limiting.

Embodiments, or examples, illustrated in the drawings are disclosed below using specific language. It will nevertheless be understood that the embodiments or examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a perspective view of a rotatable mechanism 100 in accordance with some embodiments of the present disclosure. In some embodiments, the rotatable mechanism 100 is a robotic arm or a portion of a robotic arm. The rotatable mechanism 100 includes has a first end portion 100A and a second end portion 100B opposite to the first end portion 100A. The rotatable mechanism 100 further includes motors 110, a gear reducer 120, a drive plate 130, a screw rod 140 and a joint 150.

The gear reducer 120 is connected to the first end portion 100A of the rotatable mechanism 100 and mounted to the motors 110 to shift the rotational speed of the motors 110. These motors 110 and the gear reducer 120 provide multiple different drivers for the rotatable mechanism 100. The drive plate 130 is rotatably mounted to the first end portion 100A of the rotatable mechanism 100. The screw rod 140 is connected to the first end portion 100A of the rotatable mechanism 100 with the second end portion 100B of the rotatable mechanism 100 to drive the joint 150 to rotate or move using the power generated by the motors 110.

Figure 2:
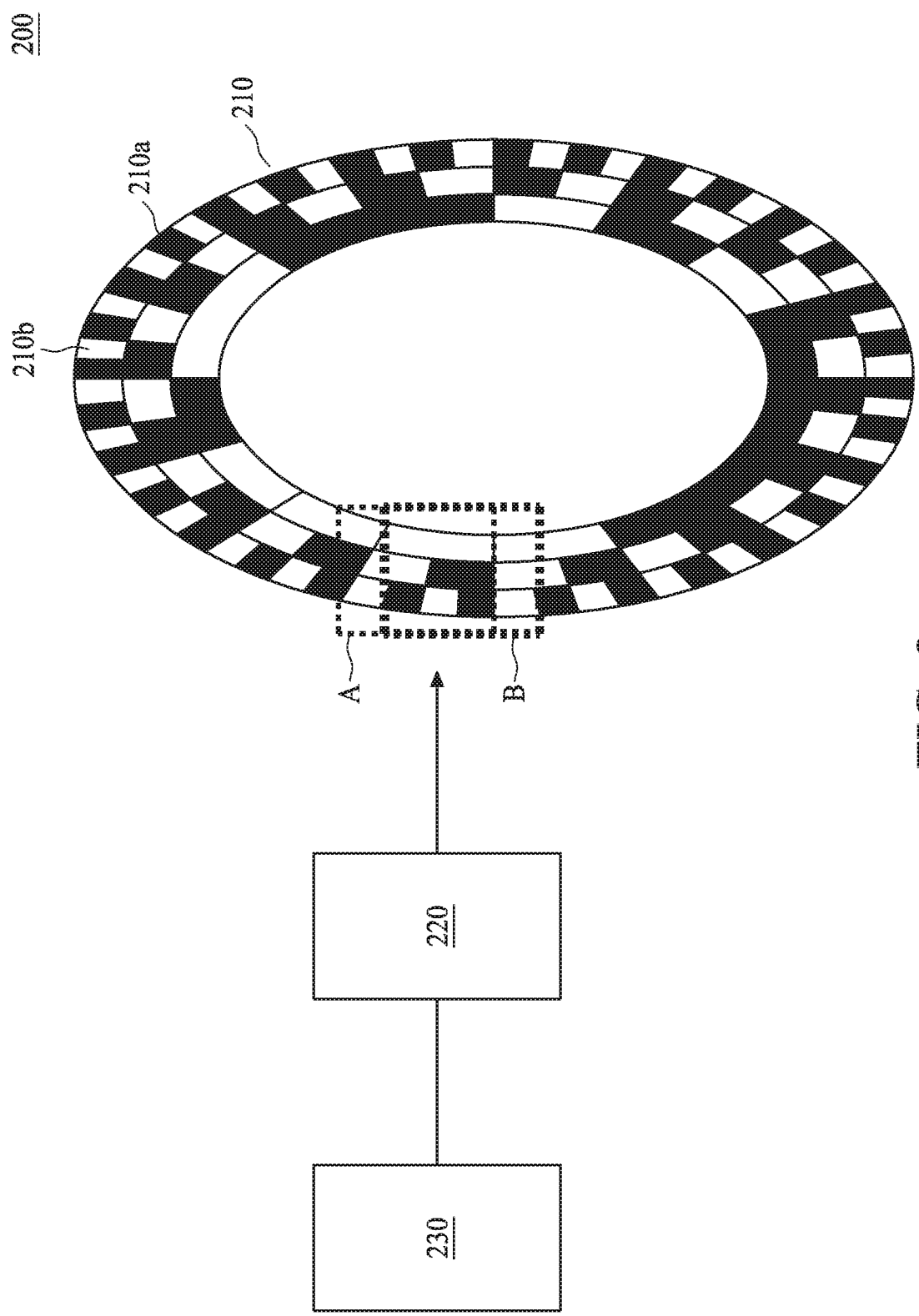
FIG. 2 illustrates a perspective view of an optical encoder in some embodiments of the present disclosure.

FIG. 2 illustrates a perspective view of an optical encoder 200 in some embodiments of the present disclosure. In some embodiments, the optical encoder 200 is an absolute encoder and can be disposed at the second end portion 100B of the rotatable mechanism 100 in FIG. 1. For example, the optical encoder 200 can be connected to or adjacent to the joint 150 of the rotatable mechanism 100 in FIG. 1. Alternatively, the optical encoder 200 can be connected to any other objects, devices or mechanisms to detect an angle and/or a position thereof. The optical encoder 200 includes a disc (also can be referred to as "encoding disc") 210, a sensor 220 and a processor 230.

The disc 210 is disposed adjacent to the sensor 220. The disc 210 includes a predetermined pattern thereon. In some embodiments, the pattern includes a series of barcode symbols. For example, the pattern includes a plurality of black portions 210a and white portions 210b. In some embodiments, the arrangements of the black portions 210a and the white portions 210b represent information regarding the angle and/or the position of the rotatable mechanism 100 in FIG. 1. In some embodiments, the black portion 210a is formed of or includes opaque materials which can block the light. The white portion 210b is formed of or includes transparent materials which allow the light to pass through them. Alternatively, the white portion 210b can be replaced by an aperture or slot depending on design requirements. In some embodiments, the pattern includes standard binary code, Gray code, single-track Gray code or any other suitable codes. In some embodiments, the disc 210 can be replaced by a plate, a frame, a rod or any other suitable elements with patterns thereon.

The sensor 220 is configured to obtain a portion of the pattern on the disc 210 and to send the obtained image to the processor 230. For example, if the disc 210 rotates so that a portion of the pattern circled in a square A is located at a capture region of the sensor 220, the image of the portion of the pattern circled in the square A is obtained by the sensor 220. Therefore, the image of the pattern obtained by the sensor 220 varies as the disc 210 rotates.

In some embodiments, the sensor 220 may include a camera to obtain images of different portions of the pattern on the disc 210. In some embodiments, the sensor 220 may include a light emitter and a light detector (also can be referred to as "photo detector," "photo sensor" or "optical sensor"). The light emitter may be a laser diode (LD), a light emitting diode (LED), a vertical-cavity surface-emitting laser (VCSEL)) diode, an edge emitting laser diode or other illuminating component. The light emitter is configured to emit light toward the pattern on the disc 210, and the light detector is configured to receive or detect the light reflected from the disc 210. In some embodiments, the light detector may include a PIN diode (a diode including a p-type semiconductor region, an intrinsic semiconductor region, and an n-type semiconductor region) or a photo-diode or a photo-transistor.

Figure 3C:
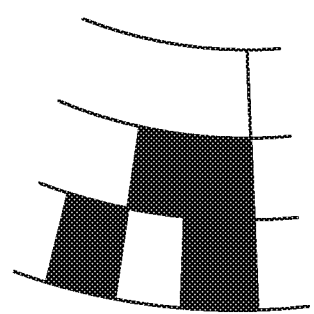
FIGS. 3A, 3B and 3C illustrates a portion of the pattern in FIG. 2 in accordance with some embodiments of the present disclosure.
Figure 3B:
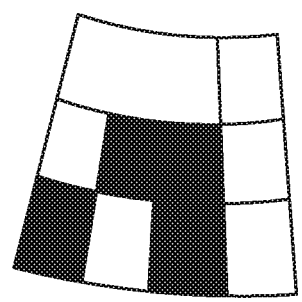
Figure 3A:
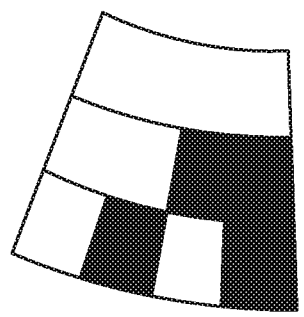

The processor 230 is configured to receive the obtained image from the sensor 220 and to determine an angle and/or a position of the rotatable mechanism 100 in FIG. 1. The processor 230 may include a memory (e.g., RAM, flash memory and the like) configured to store a series of the images of different portions of the patterns, in which each image represents or indicates a corresponding position or angle of the rotatable mechanism 100. For example, the image in FIG. 3A illustrates a portion of the pattern (circled by the square A as shown in FIG. 2) that represents an angle and/or a position 3A1 of the rotatable mechanism 100; and the image in FIG. 3B illustrates another portion of the pattern (circled by the square B as shown in FIG. 2) that represents an angle and/or a position 3B1 of the rotatable mechanism 100.

The processor 230 is also configured to compare the obtained image received from the sensor 220 with the images stored in the memory, to identify or check which image stored in the memory is most similar or identical to the obtained image and to determine the angle or position of the rotatable mechanism 100 based on the angle and position information corresponding to the identified image or the most similar image stored in the memory. For example, if the processor 230 receives the obtained image of a portion of the pattern circled by the square A from the sensor 220, the processor 230 is configured to compare the obtained image with the images illustrated in FIG. 3A and FIG. 3B (which respectively correspond to the angles or the positions 3A1 and 3B1) stored in the memory. Since the obtained image is identical to the image in FIG. 3A, the processor 230 is configured to determine that the rotatable mechanism 100 is located at the angle or the position 3A1. Therefore, the angle and/or the position of the rotatable mechanism 100 can be determined based on the image of the pattern on the disc 210 obtained by the sensor 220.

In FIG. 2, the minimum resolution of the pattern is a block, which may include a black portion or a white portion, at the outermost circle of the disc 210. Therefore, if an image obtained by the sensor 220 does not include whole blocks, the processor 230 cannot find an identical image stored in the memory. For example, if an image as shown in FIG. 3C is obtained, the processor 230 cannot find an identical image stored in the memory because the image in FIG. 3C includes a portion of the image in FIG. 3A and a portion of the image in FIG. 3B. In this case, the position of the rotatable mechanism 100 is located between the position 3A1 and the position 3B1. However, due to the insufficient resolution (e.g., a block at the outmost circlet of the disc 20) of the pattern, the processor 230 cannot determine the precise location of the rotatable mechanism 100. Instead, since the obtained image in FIG. 3C is closer to the image in FIG. 3A than the image in FIG. 3B (i.e., the image in FIG. 3C is most similar to the image in FIG. 3A), the processor 230 is configured to determine that the rotatable mechanism 100 is located at the position 3A. Therefore, an error or distortion of the position (e.g., a displacement error) of the rotatable mechanism 100 occurs. In current approaches, to eliminate or reduce such error, it is required to increase the resolution of the pattern on the disc or to increase the size of the disc to include more pattern symbols. However, increasing the size of the disc would hinder the miniaturization of the optical encoder, and increasing the resolution of the pattern on the disc would increase the cost, which would in turn reduce competitiveness in the market.

FIG. 4 illustrates a flow chart of a method for operating an optical encoder in accordance with some embodiments of the present disclosure. In some embodiments, the method in FIG. 4 is used to operate the optical encoder 200 as shown in FIG. 2. Alternatively, the method in FIG. 4 can be used to operate any other optical encoders to determine an angle or a position of an object.

Referring to operation S40, the sensor 220 in FIG. 2 is configured to obtain an image of a portion of the pattern on the disc 210 and to transmit the obtained image to the processor 230.

Referring to operation S42, the processor 230 in configured to compare the obtained image with images stored in the memory to check whether any image stored in the memory is identical to the obtained image. If so, the processor 230 is configured to determine the angle and/or the position of an object (e.g., the rotatable mechanism 100 in FIG. 1) connected to the optical encoder 200 based on the angle and position information stored in the memory as shown in operation S48.

Figure 6A:
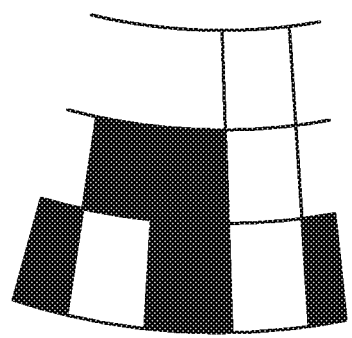
FIGS. 6A and 6B illustrates a portion of the pattern in FIG. 2 in accordance with some embodiments of the present disclosure.
Figure 6B:
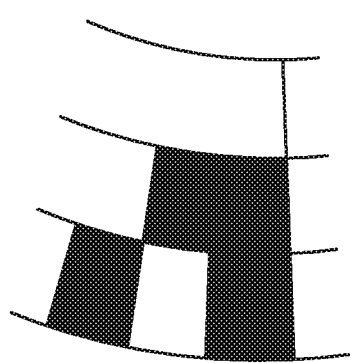

Referring to operation S44, if there is no image stored in the memory identical to the obtained image, all the images stored in the memory are shifted in a phase φ1 to obtain shifted images. In some embodiments, the images are shifted by the processor 230. In some embodiments, the phase φ1 is a calibration value of the angle and/or position corresponding to the images of the pattern stored in the memory. In some embodiments, if the minimum resolution of the pattern is X degree, the phase φ1 corresponds to X/N degree, where N is an integer greater than 1. For example, if the minimum resolution of the pattern is 1 degree, the phase φ1 corresponds to 1/N degree (e.g., ⅕ or ⅙ degree). For example, as disclosed above, the obtained image shown in FIG. 3C includes a portion of the image in FIG. 3A and a portion of the image in FIG. 3B, and thus the processor 230 cannot locate any image stored in the memory that is identical to the obtained image. Therefore, the processor 230 may shift the images in FIGS. 3A and 3B in the phase φ1 counter-clockwisely to form the shifted images as shown in FIGS. 6A and 6B respectively. In other embodiments, the processor 230 can shift the images in the phase φ1 clockwisely depending on design requirements.

Referring to operation S46, the processor 230 is configured to check whether any of the shifted images is identical to the obtained image. If so, the processor 230 is configured to determine the angle and/or the position of the object connected to the optical encoder 200 based on the angle or position information stored in the memory and the calibration value corresponding to the shifted phase φ1 as shown in operation S49. For example, assuming that the phase φ1 corresponding to ⅕ degree (e.g., 0.2 degree), if the angle corresponding to the image in FIG. 3A is 30 degrees and the angel corresponding to the image in FIG. 3B is 31 degrees, the angle corresponding to the shifted image in FIG. 6A is 30.2 degrees and the angel corresponding to the shifted image in FIG. 6B is 31.2 degrees. Since the obtained image in FIG. 3C is identical to the shifted image in FIG. 6A, the processor 230 is configured to determine that the angle of the object connected to the optical encoder 200 is 30.2 degrees.

If there is still no shifted image identical to the obtained image, the processor 230 is configured to repeat operations S44 and S46 until the processor 230 finds a shifted image that is identical to or most similar to the obtained image. In accordance with the embodiments in FIG. 4, by shifting the images stored in the memory in the phase φ1 (which is equal to (minimum resolution)/N), the resolution of the optical encoder 200 increases N times without using a larger disc or a disc with a higher resolution pattern.

FIG. 5 illustrates a flow chart of a method for operating an optical encoder in accordance with some embodiments of the present disclosure. In some embodiments, the method in FIG. 5 is used to operate the optical encoder 200 as shown in FIG. 2. Alternatively, the method in FIG. 5 can be used to operate any other optical encoders to determine an angle or a position of an object.

Referring to operation S50, the sensor 220 in FIG. 2 is configured to obtain an image of a portion of the pattern on the disc 210 and to transmit the obtained image to the processor 230.

Referring to operation S52, the processor 230 in configured to compare the obtained image with M images stored in the memory to check whether any image stored in the memory is identical to the obtained image. If so, the processor 230 is configured to determine the angle and/or the position of an object (e.g., the rotatable mechanism 100 in FIG. 1) connected to the optical encoder 200 based on the angle and position information stored in the memory as shown in operation S53.

Referring to operation S54, if there is no image stored in the memory identical to the obtained image, all the M images stored in the memory are shifted in a phase φ2 N times to obtain M×N shifted images. In some embodiments, the images are shifted by the processor 230. In some embodiments, the phase φ2 is a calibration value of the angle and/or position corresponding to the images of the pattern stored in the memory. In some embodiments, if the minimum resolution of the pattern is X degree, the phase φ2 corresponds to X/(N+1) degree, where N is an integer greater than 1. For example, if the minimum resolution of the pattern is 1 degree, the phase φ2 corresponds to 1/(N+1) degree (e.g., ⅕ or ⅙ degree). Therefore, assuming that the phase φ2 corresponds to ⅕ degree (0.2 degree, i.e., shifted four times), if the angle corresponding to the image in FIG. 3A is 30 degrees, the angle corresponding to the first shifted image (shifted in φ2) is 30.2 degree; the angle corresponding to the second shifted image (shifted in 2φ2) is 30.4 degree; the angle corresponding to the third shifted image (shifted in 3φ2) is 30.6 degree; and the angle corresponding to the fourth shifted image (shifted in 4φ2) is 30.8 degree (since the angle corresponding to the fifth shifted image (shifted in 5φ2) is 31 degree, which equals to the angle corresponding to the image in FIG. 3B, it is unnecessary to perform the fifth shift). In some embodiments, the processor 230 can shift the images in the phase φ2 clockwise or counter-clockwise depending on design requirements.

Referring to operation S56, the processor 230 is configured to check whether any of the M×N shifted images is identical to or most similar to the obtained image. Referring to operation S58, the processor 230 is configured to determine the angle and/or the position of the object connected to the optical encoder 200 based on the angle or position information stored in the memory and the calibration value corresponding to the shifted phase φ2 as shown in operation S58. For example, if the third shifted image (shifted in 3φ2) of the image in FIG. 3A is found to be identical to or most similar to the obtained image, the processor 230 is configured to determine that the object connected to the optical encoder 200 is at the angle of 30.6 degrees.

In accordance with the embodiments in FIG. 5, by shifting the images stored in the memory in the phase φ2 N times, the resolution of the optical encoder 200 increases N times without using a larger disc or a disc with a higher resolution pattern.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It can be clearly understood by those skilled in the art that various changes may be made, and equivalent components may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An encoder connected to an object, the encoder comprising:
    a plate including a pattern thereon;
    a sensor configured to obtain an image of a portion of the pattern;
    a memory configured to store a first set of M reference images corresponding to the portion of the pattern and angle and/or position information corresponding to the first set of M reference images; and
    a processor configured to:
        compare the image obtained by the sensor with the first set of M reference images; and
        in response to none of the first set of M reference images being identical to the image obtained by the sensor, expand the first set of M reference images by rotationally shifting the first set of M reference images stored in the memory in a phase N times so as to obtain an expanded set of M×N reference images; and
        compare the image obtained by the sensor with the expanded set of M×N reference images, wherein the phase equals to a minimum resolution of the pattern divided by N.

2. The encoder of claim 1, wherein the processor is further configured to determine an angle or a position of the object based on a result of the comparison between the obtained image and the first set of M reference images and/or the expanded set of M×N reference images.

3. The encoder of claim 1, wherein the processor is further configured to determine an angle or a position of the object if one of the first set of M reference images or the expanded set of M×N reference images is identical or most similar to the obtained image.

4. The encoder of claim 1, wherein the phase corresponds to an angle or position and the minimum resolution of the pattern corresponds to an angle or position.

5. The encoder of claim 1, wherein the processor is further configured to generate a calibration value for the angle and/or position information based on the phase.

6. The encoder of claim 5, wherein the processor is further configured to determine an angle or a position of the object based on the angle and/or position information and the calibration value.

7. The encoder of claim 1, wherein the processor is further configured to determine an angle or a position of the object based on a result of the comparison between the obtained image and the first set of M reference images if one of the images stored in the memory is identical or most similar to the obtained image.

8. The encoder of claim 1, wherein the sensor, the memory and the processor are integrated into a single component.

9. The encoder of claim 1, wherein the first set of M reference images stored in the memory is not pre-processed by the processor before comparison with the image obtained by the sensor.

10. The encoder of claim 1, wherein the expanded set of M×N reference images is not pre-processed by the processor before comparison with the image obtained by the sensor.

11. A method for operating an encoder connected to an object, the method comprising:
    (a) obtaining an image of a portion of a pattern;
    (b) comparing the obtained image with a first set of M reference images stored in a memory; and
    (c) in response to none of the first set of M reference images is identical to the obtained image, expanding the first set of M reference images by rotationally shifting the first set of M reference images in a phase N times to obtain an expanded set of reference images comprising M×N reference images; and
    (d) comparing the obtained image with the expanded set of M×N reference images,
    wherein the phase equals to a minimum resolution of the pattern divided by N.

12. The method of claim 11, further comprising determining an angle or a position of the object based on a result of the comparison between the obtained image and the first set of M reference images and/or the expanded set of M×N reference images.

13. The method of claim 11, further comprising determining an angle or a position of the object if one of the first set of M reference images and/or the expanded set of M×N reference images is identical or most similar to the obtained image.

14. The method of claim 11, wherein the phase corresponds to an angle or position and the minimum resolution of the pattern corresponds to an angle or position.

15. The method of claim 11, wherein each of the first set of M reference images corresponds to respective angle and/or position information of the object.

16. The method of claim 15, further comprising generating a calibration value of the angle and/or position information of the object based on the expanded set of M×N reference images.

17. The method of claim 16, further comprising determining an angle or a position of the object based on the angle and/or position information and the calibration value.

* * * * *